Sept. 14, 1954
M. J. DIAMOND
2,689,042
MAGNETIC HARDNESS TESTER
Filed May 11, 1950
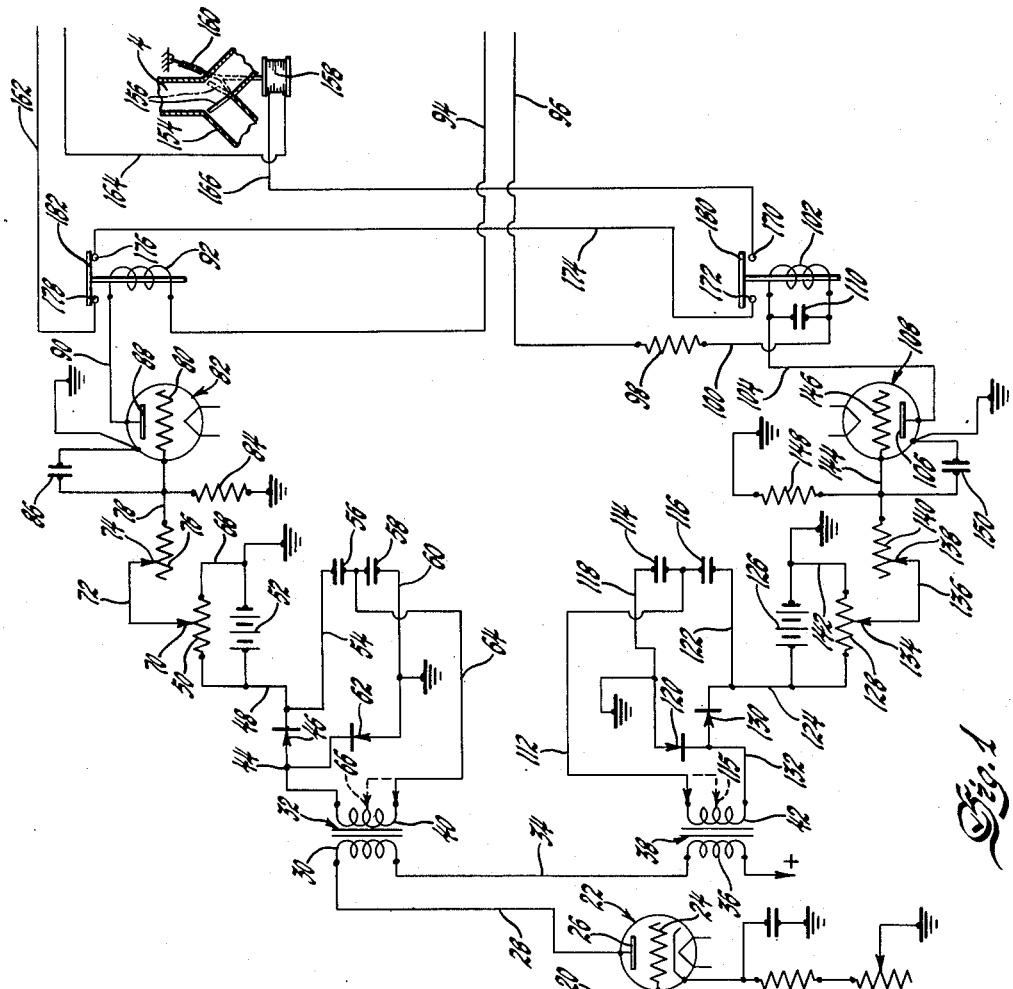

Patented Sept. 14, 1954

2,689,042

UNITED STATES PATENT OFFICE 2,689,042

MAGNETIC HARDNESS TESTER

Milton J. Diamond, Saginaw, Mich., assignor to General Motors Corporation, Detroit, Mich., a corporation of Delaware Application May 11, 1950, Serial No. 161,433

16 Claims. (Cl. 209—81)

This invention relates to testing equipment and more specifically to equipment for testing the physical properties of parts, such, for example, as the hardness thereof. Apparatus for quickly and rapidly testing parts for hardness has been designed previously and is the subject matter of my copending application S. N. 95,900, filed May 28, 1949, entitled "Electronic Hardness Tester," which matured into Patent No. 2,647,628, on August 4, 1953. In the construction illustrated and shown in that application parts to be tested are dropped through a tube or chute, magnetized above the saturation point by a very strong magnetic field having sufficient strength to support the parts momentarily, then released and dropped through a pick-up coil in which current is induced by the magnetism retained by the part which retentivity is proportional to the hardness of the part and the value of the induced current in the pick-up coil after amplification thereof determines the course of the part through the tube or chute to the proper storage means.

In classifying parts in this manner there is an acceptable range in the Brinell hardness scale, and parts falling within this range are acceptable commercially, those above being too soft and below too hard. As exemplary of the above, let it be assumed that for some particular part Brinell hardness of 3.9 to 4.4 diameter is acceptable, and in that case 3.8 would be too hard and 4.5 too soft. Then the differences in the induced voltages between parts having hardness of 3.8 and 3.9 or at the other end of the range 4.4 and 4.5, must be sufficiently great to cause actuation of the sorting means. Taking one end of the range as an illustration, parts having a 3.9 hardness must pass through and induce only a sufficient voltage to permit them to go into the chute or storage means for the satisfactory parts, while parts having a 3.8 hardness should induce sufficiently more voltage to throw the control means, permitting the shutter to be deflected and the part then to be diverted into an unsatisfactory group.

In the previous designs it has been sometimes difficult to obtain a sufficient voltage difference at both ends of the range since they are tied together by a unitary system. If the device is so adjusted as to give a satisfactory voltage difference and good selection at, for example, the soft end, then the other end of the range might not have a sufficient separation voltage and errors in selecting might occur. It was therefore necessary to sacrifice selection at one end in favor of obtaining a better selection at the opposite end. Even with this attempt to balance between the operation of the two ends, the voltage differences, because of the position on the characteristic curve of magnetization, were very small for certain settings, and unsatisfactory operation sometimes occurred.

It is therefore an object of my invention to provide means in testing mechanisms for so amplifying the induced control voltages as to render useable voltage at both ends of the range for proper selection.

It is a further object of my invention to provide in electronic hardness testing means amplifying means for the induced voltage to give a more uniform gain throughout the range in use.

It is a still further object of my invention to provide voltage doubling means in the amplifier section of testing means to assist in acquiring sufficient separation voltages.

It is a still further object of my invention to provide a single electromagnetically operated shutter or gate for sorting so that all of the satisfactory parts will follow one path and all of the unsatisfactory parts, be they too soft or too hard, follow a second path.

It is a still further object of my invention to provide suitable control means for the single shutter for selection so that it will not be partially operated by sequential pulses.

With these and other objects in view which will become apparent as the specification proceeds, my invention will be best understood by reference to the following specification and claims and the illustrations in the accompanying drawings, in which:

Figure 1 is a schematic wiring diagram of the amplifying section of my selecting means, showing the control for the diverting shutter in the chute to ascertain which direction the parts are to go; and Figure 2 is a graph showing the deflection voltages obtained over the Brinell hardness range.

Referring now more specifically to Figure 1 of the drawings, there is shown therein a pick-up coil 2 which is arranged to lie about the chute or tube 4 through which the parts drop and be located immediately underneath the magnetizing coil. One end of the pick-up coil 2 is connected to ground through line 6. The line connecting the opposite end of the coil with grid 10 of tube 12 is identified as line 8. The plate 14 of tube 12 is connected through line 16, condenser 18 and line 20 with a second amplifier tube 22, line 20 being directly connected to the control grid 24 of the same. Plate 26 of tube 22 is connected through conductive line 28 with one end of a primary winding 30 of a first transformer 32, the opposite end of said primary winding 30 being connected through line 34 with a second primary winding 36 of a second transformer 38. The opposite terminal of transformer winding 36 is connected to a positive source of voltage indicated by +.

The transformers 32 and 38 are also provided with secondary windings 40 and 42 respectively. One terminal of the transformer secondary 40 is connected through line 44 with rectifier 46 which forms part of a voltage doubler circuit or a voltage amplifying means. The opposite terminal of that rectifier is connected through line 48 with one terminal of a resistor 50 and also one terminal of a battery 52. The same terminal of the rectifier 46 is also connected through line 54 with one side of a condenser 56. This condenser is connected in series with a second condenser 58, the opposite side of which is grounded through line 60. A second rectifier 62 has one terminal connected to line 60 and to ground and the other terminal connected to line 44. Conductive line 64 is connected between an intermediate point between condensers 56 and 58 and the opposite terminal of the secondary 40. The secondary 40 also has a tap 66 to which line 64 may be connected if desired to change the ratio. It is removed from the end of the transformer and connected to the tap if desired.

The opposite terminal of resistor 50 is connected to ground through conductor 68, which is also connected to the opposite terminal of the battery. An adjustable tap 70, adapted to engage the resistor 50, is connected through line 72 to a second adjustable tap 74, engaging and adapted to be moved over a resistor 76. Resistor 76 is connected through line 78 to the control grid 80 of a thermionic tube 82. A resistance 84 is connected between line 78 and ground and a condenser 86 is also connected between line 78 and the shell of the tube which is likewise grounded. The plate 88 of the tube 82 is connected through line 90 with one terminal of a relay winding 92, the opposite terminal of which is connected through line 94 to one terminal of a suitable source of power. The other terminal of said suitable source is connected through line 96 with one end of a resistor 98, and thence through line 100 to one terminal of a second relay operating coil 102. The opposite terminal of the relay coil 102 is connected to conductor 104, and through that to the plate 106 of a second thermionic vacuum tube 108. A condenser 110 is connected directly across the relay coil 102.

An identical system to that just described above interconnects the secondary 42 with tube 108. Specifically it includes a connector 112 which extends from one end of the secondary 42 to a mid-point between two serially connected condensers 114 and 116. This secondary is likewise tapped as at 115 for alternate connection. From the opposite terminal of condenser 114 a conductor 118 extends to one terminal of a rectifier 120 and also to the ground. From the opposite terminal of condenser 116 a conductor 122 leads to another rectifier 130 and at that point it is also connected to conductor 124 which extends to the positive terminal of a battery 126 and also to one terminal of a resistor 128. Rectifier 130 is connected between conductor 132 connected to the opposite terminal of the secondary 42 and to conductor 122. An adjustable tap 134 on resistance 128 is connected by line 136 to a second adjustable tap 138 on resistor 140. The opposite terminal of resistor 128 is connected through line 142 to ground and to the negative terminal of battery 126. Resistor 140 is connected by line 144 with the control grid 146 of tube 108. A resistor 148 is connected between line 144 and ground and a condenser 150 is also connected between line 144 and the shell of the tube which is likewise grounded.

As previously mentioned, the part in the preceding construction has been conducted down through a chute or tube, such, for example, as tube 4, shown in the upper right hand corner of the drawing. This chute or tube 4 is provided at its lower extremity with a branch line 154 and also a pivoted shutter 156 or gate to determine into which portion of the lower section the part may proceed. The shutter in this case is actuated by an electromagnet 158 and is pulled in the opposite direction by a biasing spring 160 connected to the shutter and also to some stationary part. If, therefore, the shutter is not energized or moved by the electromagnet, it will remain in the full-line position shown in the drawing, by the spring tension. However, if the solenoid 158 is energized, the shutter 156 will be moved to the dotted-line position and divert the parts into the left hand route through section 154.

The control system for electromagnet 158 consists of a suitable source of power connected to incoming lines 162, 164, line 164 being directly connected to one electromagnet terminal, and a second conductive line 166 being connected to the opposite electromagnet terminal extends to a stationary switch contact 170. A spaced stationary contact 172 cooperating with the first contact 170 is connected through line 174 to a stationary contact 176. A second spaced stationary contact 178 cooperating with 176 is directly connected to incoming main line 162. The switches thus formed by the pairs of contacts 170—172 and 176—178 control the relay 158 and are bridged by conductive armatures 180 and 182 respectively. These relays 92 and 102 are of opposite types; that is, relay 92 is of the type in which the armature normally closes the contact between stationary contacts 176 and 178 when the relay coil is deenergized and opens when the relay energizes, while relay coil 102 is of the type in which the armature 180 normally is removed from the stationary contact and completes the circuit upon energization of the relay.

The portion of the chute 4 to the right therefore conducts parts out to a storage bin which are not satisfactory; that is, of the type that are either too hard or too soft, and the butterfly 156 remains in the position shown in solid lines. If the part has a hardness falling within the required range, the butterfly 156 is moved to the dotted line position and the parts are ejected to a storage bin through chute 154, as being satisfactory parts. In the operation of the system, the part falls first through a magnetizing coil, not shown herein but described fully in my previous co-pending application, and is magnetized above the saturation point. It then continues down chute 4 to fall through the pick-up coil 2 and the current induced in coil 2 applies a voltage to the control grid 10, causing tube 12 to conduct, the amount of current flow depending upon the voltage of grid 10. This, therefore, applies a further amplified control voltage to amplifier tube 22, causing that tube to amplify and apply its output to the two primary coils 30 and 36 in series.

Taking only one path for the moment, since the two paths are duplicates, the energization of primary coil 30 induces a current in its secondary 40, which is applied to the voltage doubler consisting of rectifiers 46, 62 and the two condensers 56, 58. This doubles the voltage in the secondary circuit of the transformer 32, and applies such control voltage to the resistor 50 and in series therewith the resistor 76, the amounts of each being adjustable in said circuit for any particular application. This control voltage lastly is applied to the control grid of the tube 82 and determines the conductivity of that tube. If sufficient conductivity is obtained through tube 82, then relay coil 92 will be energized to actuate its armature 182. Exactly the same chain of events occurs in that circuit between the secondary 42 of the transformer 38 and the operating coil 102 of the relay. Adjustments for the amount of control voltage to be applied to the control grids 80 and 146 of the tubes 82 and 108 respectively are made by moving the adjustable taps 70—74 and 134—138 so that the exact point of triggering of the control tubes is obtained for a particular application. The taps on the secondaries are also selected as the application may demand.

Let us assume first that a part which is too hard is dropped through the chute and it induces a current in the pick-up coil 2. This will provide a high amount of induced voltage in the coil which is amplified through the various tubes 12 and 22 and applied to the primaries 30 and 36. It will cause tube 108 to conduct a sufficient amount of current to actuate relay 102, closing armature 180, and completing the circuit for the solenoid 158. The circuit for the same is as follows: incoming line 164, relay coil 158, line 166, stationary contact 170, bridging armature 180, stationary contact 172, line 174, stationary contact 176, armature 182, stationary contact 178, and incoming line 162. However, before the relay coil 158 can pull the shutter 156 from the full-line position into the dotted-line position to divert the part into chute 154, the relay coil 92 has likewise been energized, due to the current induced through transformer 32 and applied through the voltage doubler circuit to the control grid 80 of the tube 82 and that relay opens its armature 182 to break the circuit so that the solenoid 158 is not energized. Since these two coil energizations 102 and 92 appear substantially simultaneously, the circuit is both closed at one point and open at another before the coil 158 has a chance to actuate the shutter. The part, therefore, being too hard, will proceed down the right hand extension of the tube 4 into the unsatisfactory bin.

Let it now be assumed that the part has a hardness falling within the required range. Again as the part falls through the pick-up coil, a voltage will be induced therein by its passage and said voltage will be amplified by tubes 12 and 22, and in like manner applied to the primaries 30 and 36 of the transformers 32 and 38 respectively. In this case the adjustment of the resistors 128 and 140 is such as to provide the proper voltage at the predetermined hardness level to the control grid 146 of tube 108, and that tube will conduct a sufficient amount of current to energize relay coil 102 at that point and close its armature 180 on switch contacts 170 and 172. As before, this completes the previously traced circuit for the relay coil 158, and in this case it is energized to move the shutter 156 over to the dotted-line position. At this time the resistors 50 and 76 have had their adjustable taps so adjusted that there is insufficient voltage applied to the control grid 80 of the tube 82 so that tube does not conduct a sufficient amount of current to energize relay coil 92 with sufficient strength to open its armature 182. The part therefore is discharged through the chute 154 into the satisfactory storage bin.

If the part has a hardness which is too soft or below the range which is desired, the result is obvious. As that part falls through the pick-up coil tube, insufficient voltage will be induced therein to trigger either tube 108 or 82, the relay coils 102 and 92 will not be energized, thus preventing the energization of relay coil 158, the shutter will stay in its present full-line position, and the part will proceed down the right hand chute into the unsatisfactory bin.

The graph shown in Figure 2 has an ordinate scale relating to the various Brinell hardness figures, the abscissa being in terms of induced or deflection voltages. The curve at the right identified as A indicates the amount of deflection voltage obtained by the prior system not using the voltage doubling means by parts having indicated Brinell hardness. By perusing this curve it is obvious that with parts having a Brinell hardness of 4.5, the deflection voltage is roughly 3.6, while a Brinell hardness of 4.4 induces a voltage of approximately 4. Thus the operator is provided with a voltage spread of approximately .4 volts to give the separation between satisfactory and unsatisfactory parts and operate the selecting relays. However, when we approach the other end of the range we find that at 3.9 Brinell hardness there is approximately 6 volts induced, while at 3.8 there is very little more, possibly 6.1. Thus at this end of the range we have only a voltage spread of .1 to give the separation between satisfactory and unsatisfactory parts, and this makes it very difficult to produce proper selection at this end.

However, by using the system disclosed in the present application, in which voltage doublers are used between the outputs of the two transformers and the control tubes that are operated thereby, we find that the curve labeled B is produced. It will be immediately noticed that this curve in general gives a much wider spread of voltage between the various Brinell hardness points indicated. At the low end of the scale, that is, between 4.5 and 4.4 Brinell hardness, there exists well over one volt deflection difference, while at the high point or difference between 3.9 and 3.8 Brinell hardness, there is at least ½ volt difference. Both of these provide a very satisfactory separation, and also relatively easy selection for the machine between satisfactory and unsatisfactory parts.

Since in selecting parts that are above the hardness range, both relay coils 102 and 92 are energized, it is difficult to obtain the energization exactly simultaneously, and in fact they would tend to operate a little in sequence, and there was a tendency for a so-called bob to appear in the operation of the shutter 156; that is, it would start to move toward its dotted-line position when armature 180 closed, but then when armature 182 opened, would return to the full-line position. This bob was eliminated by the use of a condenser 110 across relay coil 102 and the insertion of resistance 98 in series therewith. This would delay the energization of this coil so that the relay coil 92 is operated either simultaneously with or earlier than relay coil 102, Therefore, the solenoid for the control gate would never receive a pulse to cause it to bob.

I claim:

1. In testing equipment having means in which current is induced by the passage of a magnetized part along a predetermined path, diverting shutter means on the path to determine the destination of the parts, a control circuit for the diverting shutter, a plurality of relay means in series in said control circuit to jointly determine operative positions of said shutter, and conductive connecting means including individual adjustable voltage amplifying means connected between the means in which current is induced by the passage of a part and each relay means to control the latter by the amount of induced voltage in the former.

2. In testing equipment having means in which current is induced by the passage of a magnetized part along a predetermined path, amplifying means connected to the means in which current is induced, a pair of output circuits connected to the output of the amplifying means, adjustable voltage amplifying means connected to each output circuit, individual relay means connected to each voltage amplifying means, diverting shutter means on the path along which the part moves, and switching means controlling the operation of the shutter jointly operated by the relay means.

3. In testing equipment having means in which current is induced by the passage of a magnetized part along a predetermined path, amplifying means connected to the means in which current is induced, a pair of output circuits connected to the output of the amplifying means, voltage amplifying means connected to each output circuit, a thermionic tube connected to the output of each voltage amplifying means whose conductance is controlled by the output thereof, relay means connected to the output of each tube, means in the circuit between the voltage amplifying means and the thermionic tube to adjust the input to each tube so that the tubes may be set to conduct at different energy levels to control the relay circuit, selecting means in the path of the parts to determine their destination, and a plurality of switching means connected in series to the selecting means and each switching means operated individually by its relay means, jointly controlling the selecting means.

4. In testing equipment having means in which current is induced by the passage of a magnetized part along a predetermined path, amplifying means connected to the means in which current is induced, a pair of output circuits connected to the output of the amplifying means, voltage amplifying means connected to each output circuit, a thermionic tube connected to the output of each voltage amplifying means whose conductance is controlled by the output thereof, relay means connected to the output of each tube and means in circuit between the voltage amplifying means and the thermionic tube means to adjust the input to each tube independently, diverting shutter means to classify the magnetized parts, and a plurality of switching means in series circuit with the shutter means operated by said relay means to control the energization of the shutter means.

5. In testing equipment having means in which current is induced by the passage of a magnetized part along a predetermined path, amplifying means connected to the means in which current is induced, a pair of output circuits connected to the output of the amplifying means, voltage amplifying means connected to each output circuit, a thermionic tube connected to the output of each voltage amplifying means whose conductance is controlled by the output thereof, relay means connected to the output of each tube and means in circuit between the voltage amplifying means and the thermionic tube means to adjust the input to each tube independently, diverting shutter means to classify the magnetized parts, a plurality of switching means in series circuit with the shutter means operated by said relay means to control the energization of the shutter means and impedance means in circuit with one of the relay means to provide a time delay in the operation of one switching means.

6. In testing equipment having means in which current is induced by the passage of a magnetized part along a predetermined path, amplifying means connected to the means in which current is induced, a pair of output circuits connected to the output of the amplifying means, relay means connected to each output circuit, a diverting shutter electromagnetically controlled to classify the parts, and switching means operated by each relay means and connected in series relation with the electromagnet of said shutter to coincidentally control the energization of said electromagnet to complete the circuit for the electromagnet only for parts lying over a range between predetermined limits.

7. In testing equipment having means in which current is induced by the passage of a magnetized part along a predetermined path, amplifying means connected to the means in which current is induced, a pair of output circuits connected to the output of the amplifying means, relay means connected to each output circuit, a diverting shutter electromagnetically controlled to classify the parts, switching means operated by each relay means and connected in series relation with the electromagnet of said shutter to coincidentally control the energization of said electromagnet and impedance means connected in circuit with one of the relay means to provide a time delay in the operation thereof.

8. In testing equipment having means in which current is induced by the passage of a magnetized part along a path, electromagnetic shutter means on the path for directing the parts in different directions, a normally closed switch, a normally open switch, a source of power, said electromagnet and two switches being connected in series relation and to said source of power, relay means for each of the switch means and two independent circuits containing adjustable means interconnecting said means in which current is induced to the relay means so that they may be adjusted to operate at different signal strengths from the main induced current to complete the circuit for the electromagnet only for parts lying over a range between predetermined limits and classify parts falling outside.

9. In testing equipment having means in which current is induced by the passage of a magnetized part along a path, electromagnetic shutter means on the path for directing the parts in different directions, a normally closed switch, a normally open switch, a source of power, said electromagnet and two switches being connected in series relation and to said source of power, relay means for each of the switch means, two independent circuits containing adjustable means interconnecting said means in which current is induced to the relay means so that they may be adjusted to operate at different signal strengths from the main induced current and classify parts falling outside a prescribed range and impedance means connected in circuit with one of the relay means to provide a time delay in its operation.

10. In testing equipment having means in which current is induced by the passage of a magnetized part along a path, electromagnetic shutter means on the path for directing the parts in different directions, a source of power, a plurality of switches connected to the electromagnet and the power source to control the same, relay coils for operating each switch, an electron tube connected in circuit with each relay coil and the source of power to determine conductive periods thereof, a control electrode in each tube, amplifying means connected to the means in which current is induced and a pair of conductive circuits interconnecting the amplifier output with the control electrodes of the tubes each including voltage amplifying means to provide energy to the control elements from the induced current and control the shutter position by the amount of induced current.

11. In testing equipment having means in which current is induced by the passage of a magnetized part along a path, electromagnetic shutter means on the path for directing the parts in different directions, a source of power, a plurality of switches connected to the electromagnet and the power source to control the same, relay coils for operating each switch, an electron tube connected in circuit with each relay coil and the source of power to determine conductive periods thereof, a control electrode in each tube, and a plurality of separate circuits interconnecting the means in which currents are induced by the passage of a part of the control electrodes of the tubes including a voltage amplifier and an adjustable current means in each to provide energy to the tubes from the induced current and control the relays and the shutter position by the amount of induced current.

12. In hardness testing means for sorting parts having a predetermined range of hardness from those of softer or harder characteristics having means in which current is induced by the passage of a magnetized part along a predetermined path, a diverting shutter means on the path to determine the destination of the parts, a control circuit for the diverting shutter, a plurality of switches in series in said control circuit, a plurality of relay means to actuate said switches, conductive means including adjustable means to independently connect each relay means to the means in which current is induced by the passage of a part so that one relay may be adjusted to operate at one limit of the range of hardness of the part and another relay at the other limit and together energize the control circuit over the prescribed range.

13. In hardness testing means for sorting parts having a predetermined range of hardness from those of softer or harder characteristics having means in which current is induced by the passage of a magnetized part along a predetermined path, a diverting shutter means on the path to determine the destination of the parts, a control circuit for the diverting shutter, a plurality of switches in series in said control circuit, a plurality of relay means to actuate said switches, amplifying means connected to the means in which current is induced by the passage of a part and separate conductive means connecting the output of the amplifying means to each of the relay means including adjustable means for varying the voltage so that the relay means may be separately adjusted to operate at the limits of a prescribed range.

14. In hardness testing means for sorting parts having a predetermined range of hardness from those of softer or harder characteristics having means in which current is induced by the passage of a magnetized part along a predetermined path, a diverting shutter means on the path to determine the destination of the parts, a control circuit for the diverting shutter, a plurality of switches in series in said control circuit, a plurality of relay means to actuate said switches, amplifying means connected to the means in which current is induced by the passage of a part, an electronic tube connected to each relay means and independent conductive means connecting the output of the amplifier means to each electronic tube including voltage amplifying means and adjustable means so that each relay can be independently adjusted to accurately operate at one of the limits of hardness prescribed.

15. In hardness testing means for sorting parts having a predetermined range of hardness from those of softer or harder characteristics having means in which current is induced by the passage of a magnetized part along a predetermined path, a diverting shutter means on the path to determine the destination of the parts, a control circuit for the diverting shutter, a plurality of switches in series in said control circuit, a plurality of relay means to actuate said switches, amplifying means connected to the means in which current is induced by the passage of a part, an electronic tube connected to each relay means, independent conductive means connecting the output of the amplifier means to each electronic tube including voltage amplifying means and adjustable means so that each relay can be independently adjusted to accurately operate at one of the limits of hardness prescribed, and time delay means in circuit with one of the relay means to provide for smooth operation of the shutter means.

16. In testing means in which a magnetized part moves along a predetermined path, inductive means adjacent said path in which current is induced by the passage of a part, a plurality of separate, adjustable, amplifying means connected to the inductive means to provide a plurality of independent control voltages of different values, selecting means in the path of the parts to determine their destination, a plurality of relay means connected in series with the selecting means and control means for each relay means separately connected to each of the amplifying means.

References Cited in the file of this patent

UNITED STATES PATENTS

| Number | Name | Date |
|---|---|---|
| 2,045,769 | Geffcken | June 30, 1936 |
| 2,312,357 | Odquist | Mar. 2, 1943 |
| 2,357,745 | Kliever | Sept. 5, 1944 |
| 2,423,534 | Upton | July 8, 1947 |
| 2,427,774 | Fredrickson | Sept. 23, 1947 |
| 2,444,751 | Scott | July 6, 1948 |
| 2,504,731 | Rose | Apr. 18, 1950 |
| 2,527,797 | Cohen | Oct. 31, 1950 |
| 2,534,958 | Deming | Dec. 19, 1950 |
| 2,554,329 | Hammond | May 22, 1951 |
| 2,566,767 | Hunt | Sept. 4, 1951 |

FOREIGN PATENTS

| Number | Country | Date |
|---|---|---|
| 581,964 | Great Britain | Oct. 31, 1946 |